US012565165B2

(12) United States Patent
Wakazono et al.

(10) Patent No.: US 12,565,165 B2
(45) Date of Patent: Mar. 3, 2026

(54) ON-VEHICLE BACK-UP CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP); TOYOTA JIDOSHA KABUSHIKI KAISHA, Toyota (JP)

(72) Inventors: Keisuke Wakazono, Yokkaichi (JP); Kazuki Masuda, Yokkaichi (JP); Takeshi Hasegawa, Yokkaichi (JP); Yuki Sano, Osaka (JP); Yukiyoshi Ueno, Toyota (JP); Ryosuke Takahashi, Toyota (JP); Tatsunori Mori, Toyota (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/873,815

(22) PCT Filed: Jun. 30, 2022

(86) PCT No.: PCT/JP2022/026282
§ 371 (c)(1),
(2) Date: Dec. 11, 2024

(87) PCT Pub. No.: WO2024/004145
PCT Pub. Date: Jan. 4, 2024

(65) Prior Publication Data
US 2025/0360887 A1 Nov. 27, 2025

(51) Int. Cl.
B60R 16/033 (2006.01)
B60L 58/18 (2019.01)
(Continued)

(52) U.S. Cl.
CPC ............ B60R 16/033 (2013.01); B60L 58/18 (2019.02); H02J 9/061 (2013.01); B60L 50/60 (2019.02);
(Continued)

(58) Field of Classification Search
CPC ........ B60R 16/033; B60L 58/18; B60L 50/60; H02J 9/061; H02J 7/00304; H02J 2310/48
See application file for complete search history.

(56) References Cited

U.S. PATENT DOCUMENTS

2019/0220027 A1    7/2019   Nakayama et al.

FOREIGN PATENT DOCUMENTS

JP        2009296808 A    12/2009
JP        2018191440 A    11/2018
JP        2019126208 A     7/2019

OTHER PUBLICATIONS

International Search Report, Application No. PCT/JP2022/026282, mailed Aug. 23, 2022. ISA/Japan Patent Office.

*Primary Examiner* — Daniel Cavallari
(74) *Attorney, Agent, or Firm* — Honigman LLP

(57) ABSTRACT

An on-vehicle backup control device includes a plurality of chargers each of which supplies a charging current based on power supplied from a first power source unit, and an adjustment unit that controls the plurality of chargers. Each of the chargers performs an operation for supplying a charging current to a corresponding power storage. The adjustment unit adjusts the charging operations of the plu- (Continued)

rality of chargers so as to keep a sum of charging currents to the plurality of power storages within an acceptable range.

3 Claims, 4 Drawing Sheets

(51) Int. Cl.
  *H02J 9/06*      (2006.01)
  *B60L 50/60*     (2019.01)
  *H02J 7/00*      (2006.01)
(52) U.S. Cl.
  CPC ....... *H02J 7/00304* (2020.01); *H02J 2310/48*
                (2020.01)

ON-VEHICLE BACK-UP CONTROL DEVICE

CROSS-REFERENCE TO RELATED APPLICATIONS

This application is the U.S. national stage of PCT/JP2022/026282 filed on Jun. 30, 2022, the contents of which are incorporated herein.

TECHNICAL FIELD

The present disclosure relates to an on-vehicle backup control device.

BACKGROUND

JP 2009-296808 A discloses a power storage device configured to supply power from a power storage that is a backup power source, to a load, when the voltage of a main power source drops. The power storage device outputs a power charge signal to a power charging circuit when the use of the vehicle is started. Upon receiving the charge signal, the charging circuit charges the power storage with the power of the main power source.

In the power storage device disclosed in JP 2009-296808 A, for purposes such as enhancing the redundancy of power supply to the load, it is conceivable to provide a plurality of power storages as a backup power source. However, if the same level of charging current as that conventionally supplied to one power storage is supplied to each of the plurality of power storages, the load on the power storage device becomes increased.

SUMMARY

An object of the present disclosure is to reduce the load imposed on an on-vehicle power supply system during a charging operation.

An on-vehicle backup control device according to one aspect of the present disclosure is an on-vehicle backup control device configured to be used in an on-vehicle power supply system including a first power source unit and a second power source unit that includes a plurality of power storages, and to perform a backup operation for outputting power to a load based on power from the second power source unit at least when power supply from the first power source unit to the load fails, the backup control device including a plurality of chargers each of which supplies a charging current based on power supplied from the first power source unit; and an adjustment unit that controls the plurality of chargers, in which each of the chargers performs an operation for supplying a charging current to corresponding one of the power storages, and the adjustment unit adjusts charging operations of the plurality of chargers so as to keep a sum of the charging currents to the plurality of power storages within an acceptable range.

Advantageous Effects

With the technology according to the present disclosure, it is possible to reduce the load imposed on the on-vehicle power supply system during the charging operation.

DETAILED DESCRIPTION OF PREFERRED EMBODIMENTS

Figure 1:
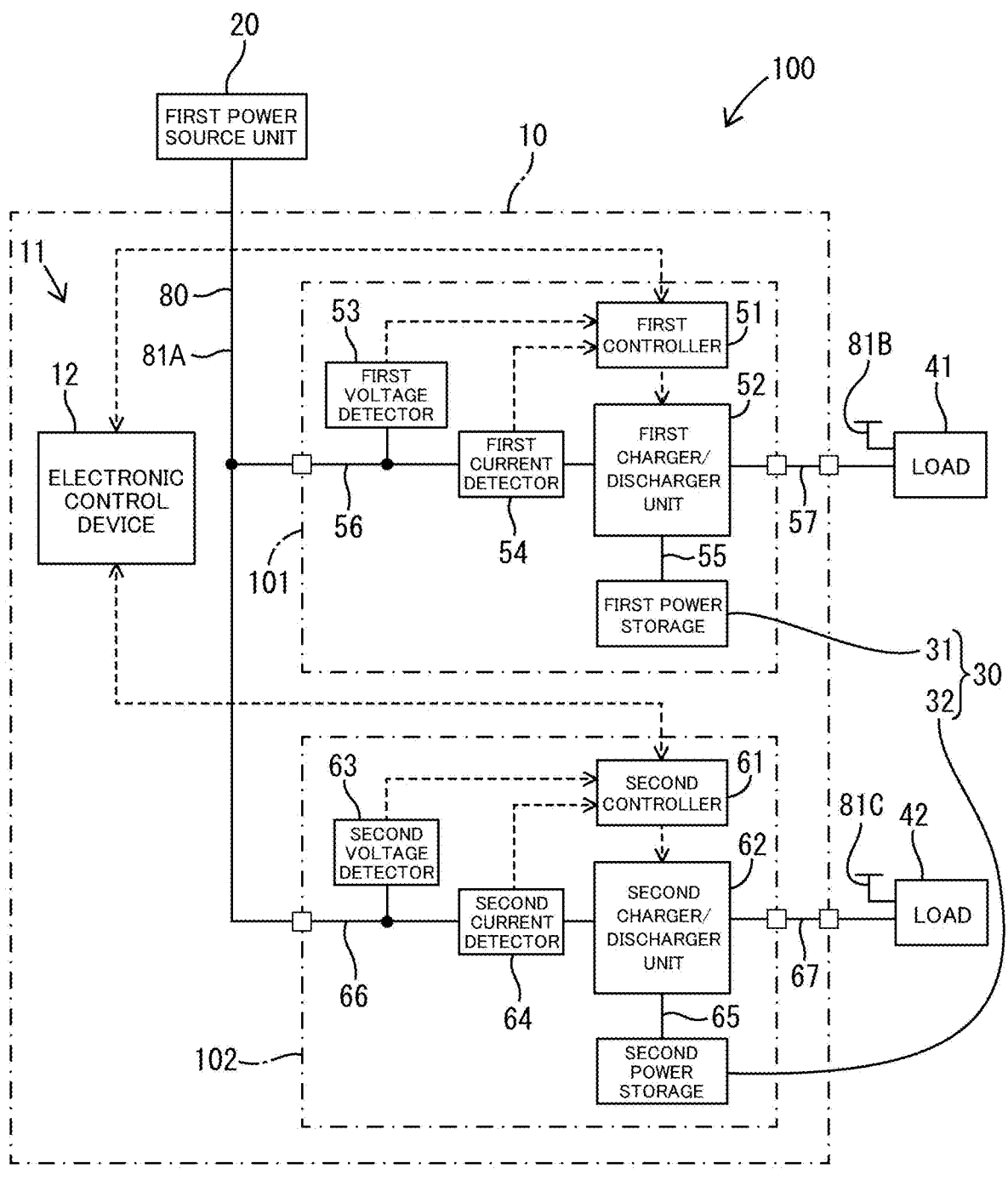
FIG. 1 is a block diagram schematically illustrating an on-vehicle power supply system including an on-vehicle backup control device according to a first embodiment.

Some embodiments of the present disclosure will now be summarized and described. Note that the features described below may be combined in any manner within a scope not causing inconsistency.

In a first aspect, an on-vehicle backup control device configured to be used in an on-vehicle power supply system including a first power source unit and a second power source unit that includes a plurality of power storages, and to perform a backup operation for outputting power to a load based on power from the second power source unit at least when power supply from the first power source unit to the load fails, the backup control device including a plurality of chargers each of which supplies a charging current based on power supplied from the first power source unit; and an adjustment unit that controls the plurality of chargers, wherein each of the chargers performs an operation for supplying a charging current to corresponding on of the power storages, and the adjustment unit adjusts charging operations of the plurality of chargers so as to keep a sum of the charging currents to the plurality of power storages within an acceptable range.

In the on-vehicle backup control device according to the first aspect, since the adjustment unit adjusts the charging operations of the plurality of chargers so as to keep the sum of the charging currents to the plurality of power storages within the acceptable range, power can be supplied from the first power source unit such that the charging currents are within the acceptable range. Therefore, by appropriately setting the acceptable range of the charging currents, it is possible to reduce the load imposed on the on-vehicle power supply system.

In a second aspect, the on-vehicle backup control device according to the first aspect has the following features. The adjustment unit includes a plurality of controllers, a plurality of detectors, and an electronic control device. The electronic control device communicates with the plurality of controllers. Each of the detectors detects a value of a charging current supplied to corresponding one of the chargers. Each of the controllers controls corresponding one of the chargers, and transmits charging current information with which a value of the charging current detected by the detector can be identified, to the electronic control device. The electronic control device controls the plurality of controllers so as to keep a sum of charging currents to the plurality of power storages within an acceptable range, on the basis of the charging current information provided from the plurality of controllers.

With the on-vehicle backup control device according to the second aspect, since the electronic control device is configured to control all of the controllers, the controllers can control their respective chargers on the basis of the control of the electronic control device. Therefore, control in each of the controllers can be simplified.

In a third aspect, the on-vehicle backup control device according to the first aspect has the following features. The adjustment unit includes a plurality of controllers and a plurality of detectors. Each of the detectors detects a value of a charging current supplied to corresponding one of the chargers. Each of the controllers controls corresponding one of chargers. The controllers communicate with each other, and control the plurality of chargers based on the values of the charging currents detected by the plurality of detectors so as to keep a sum of the charging currents to the plurality of power storages within an acceptable range.

In the on-vehicle backup control device according to the third aspect, since the controllers communicate with each other and control the chargers, it is not necessary to provide a separate control device that integrally controls the plurality of controllers. Therefore, charging control can be completed within the controllers.

First Embodiment

The on-vehicle power supply system 100 illustrated in FIG. 1 includes a first power source unit 20, a second power source unit 30, loads 41, 42, and an on-vehicle backup control device 10. The on-vehicle backup control device 10 is also simply referred to as a backup control device 10.

The first power source unit 20 serves as a main power source that continuously supplies power once the vehicle having the on-vehicle power supply system 100 onboard is started. The first power source unit 20 is a DC power source which generates a DC voltage. The first power source unit 20 is implemented as a battery such as a lead battery, for example. A high-potential side terminal of the first power source unit 20 is electrically connected to a power path 80, and a low-potential side terminal of the first power source unit 20 is electrically connected to the ground. The first power source unit 20 applies a predetermined voltage to the power path 80. In the description herein, the voltage is a voltage with the ground as a reference, unless otherwise specified.

The first power source unit 20 is electrically connected to the loads 41, 42 via the power path 80. The power from the first power source unit 20 is supplied to the loads 41, 42 via the power path 80. In the example illustrated in FIG. 1, the power path 80 includes a power path 81A that is a conductive path directly connected to the first power source unit 20, a power path 81B connected to the load 41, and a power path 81C that is a conductive path connected to the load 42. The power paths 81A, 81B, and 81C are electrically connected to each other. While the power is being supplied from the first power source unit 20 to the loads 41, 42, the power paths 81A, 81B, and 81C are at the same potential. The power path 80 is provided with a relay, a fuse, and the like, not illustrated, and these elements have a function of cutting off the conduction of the power path 80.

The loads 41, 42 are on-vehicle electrical devices to be installed on the vehicle. The loads 41, 42 are the loads to which power supply is desired in an abnormal state (failure state), in which power supply from the first power source unit 20 stops. The loads 41, 42 may be actuators such as motors, for example. As other examples, the loads 41, 42 may be an ECU or an actuator in an electric parking brake system, or an ECU or an actuator in a shift-by-wire control system. The loads 41, 42 may be on-vehicle electric devices other than those mentioned above.

The backup control device 10 includes an adjustment unit 11, a first charger/discharger unit 52, a first voltage detector 53, a second charger/discharger unit 62, and a second voltage detector 63. The adjustment unit 11 controls the first charger/discharger unit 52 and the second charger/discharger unit 62. The adjustment unit 11 includes an electronic control device 12, a first controller 51, a first current detector 54, a second controller 61, and a second current detector 64. The first charger/discharger unit 52 and the second charger/discharger unit 62 correspond to an example of "chargers" according to the present disclosure. The first controller 51 and the second controller 61 correspond to an example of "controllers" according to the present disclosure. The first current detector 54 and the second current detector 64 correspond to an example of "detectors" according to the present disclosure.

The electronic control device 12 is a control device different from the first controller 51 and the second controller 61. The electronic control device 12 is a control device not included in a first power storage unit 101 and a second power storage unit 102, which are to be described later. The electronic control device 12 is implemented as a high level electronic control unit (ECU) installed on a vehicle, for example. The electronic control device 12 can communicate with the first controller 51 and the second controller 61. The electronic control device 12 controls the first controller 51 and the second controller 61.

The backup control device 10 is a device capable of performing a backup power supply operation to the loads 41, 42 on the basis of the power of a second power source unit 30 (the first power storage 31 and the second power storage 32) in a predetermined state (abnormal state) in which the power supply from the first power source unit 20 to the loads 41, 42 is interrupted or drops.

The on-vehicle power supply system 100 includes the first power storage unit 101 and the second power storage unit 102. The first power storage unit 101 includes the first power storage 31, the first controller 51, the first charger/discharger unit 52, the first voltage detector 53, and the first current detector 54. The second power storage unit 102 includes the second power storage 32, the second controller 61, the second charger/discharger unit 62, the second voltage detector 63, and the second current detector 64.

The first power storage 31 and the second power storage 32 function as a secondary power source. The first power storage 31 and the second power storage 32 correspond to an example of "power storages" according to the present disclosure. The first power storage 31 and the second power storage 32 are DC power sources which output DC voltages, and are, for example, electric double layer capacitors. The first power storage 31 is electrically connected to the first charger/discharger unit 52, which will be described later, via a conductive path 55, and is charged and discharged via the first charger/discharger unit 52. The charge voltage (output voltage) of the first power storage 31 is the voltage applied to the conductive path 55. A high-potential side terminal of the first power storage 31 is electrically connected to the conductive path 55, and is at the same potential as the conductive path 55. A low-potential side terminal of the first power storage 31 is electrically connected to the ground, and is at the same potential as the ground.

The second power storage 32 is electrically connected to the second charger/discharger unit 62, which will be described later, via a conductive path 65, and is charged and discharged via the second charger/discharger unit 62. The charge voltage (output voltage) of the second power storage 32 is the voltage applied to the conductive path 65. A high-potential side terminal of the second power storage 32 is electrically connected to the conductive path 65, and is at the same potential as the conductive path 65. A low-potential side terminal of the second power storage 32 is electrically connected to the ground, and is at the same potential as the ground.

In the backup control device 10, during a stopped state in which the start switch of the vehicle having the on-vehicle power supply system 100 onboard is in an off state, the charge voltages (output voltages) of the first power storage 31 and the second power storage 32 are kept equal to or lower than a standby voltage. Then, in response to the start switch of the vehicle being switched to an on state, the backup control device 10 perform charging so as to make the charge voltages of the first power storage 31 and the second power storage 32 equal to or higher than a target voltage which is higher than the standby voltage. While the start switch of the vehicle is in the on state, the charge voltages of the first power storage 31 and second power storage 32 are maintained at a target voltage unless any failure occurs. When the start switch of the vehicle is switched from the on state to the off state, the backup control device 10 discharges the first power storage 31 and the second power storage 32 until the charge voltages of the first power storage 31 and the second power storage 32 become equal to or lower than the standby voltage.

The first charger/discharger unit 52 functions to supply a charging current to the first power storage 31 based on the power supplied from the first power source unit 20, and also functions to output the power based on the first power storage 31 toward the load 41. The first charger/discharger unit 52 operates on the basis of the control of the first controller 51, which will be described later. The first charger/discharger unit 52 is disposed between a conductive path 56 and a conductive path 57. The conductive path 57 is a conductive path between the first charger/discharger unit 52 and the load 41. The first charger/discharger unit 52 includes a voltage converter circuit such as a DC-DC converter, for example. The voltage converter circuit performs a charging operation and a discharging operation for the first power storage 31. As the charging operation, the voltage converter circuit performs a voltage conversion operation of stepping up or stepping down the voltage applied to the conductive path 56, and applying the resultant voltage to the conductive path 55. As the discharging operation, the voltage converter circuit performs a voltage conversion operation of stepping up or stepping down the voltage applied to the conductive path 55, and applying the resultant voltage to the conductive path 57.

The second charger/discharger unit 62 functions to supply a charging current to the second power storage 32 based on the power supplied from the first power source unit 20, and also functions to output the power based on the second power storage 32 toward the load 42. The second charger/discharger unit 62 operates on the basis of the control of the second controller 61, which will be described later. The second charger/discharger unit 62 is disposed between a conductive path 66 and a conductive path 67. The conductive path 67 is a conductive path between the second charger/discharger unit 62 and the load 42. The second charger/discharger unit 62 includes a voltage converter circuit such as a DC-DC converter, for example. The voltage converter circuit performs a charging operation and a discharging operation for the second power storage 32. As the charging operation, the voltage converter circuit performs a voltage conversion operation of stepping up or stepping down the voltage applied to the conductive path 66, and applying the resultant voltage to the conductive path 65. As the discharging operation, the voltage converter circuit performs a voltage conversion operation of stepping up or stepping down the voltage applied to the conductive path 65, and applying the resultant voltage to the conductive path 67.

The first controller 51 controls the operation of supplying power from the first power storage 31 to the load 41. The first controller 51 is an information processing apparatus including functions such as an information processing function, a calculation function, and a control function. The first controller 51 is configured mainly as a microcomputer, for example, and includes components such as a processor, e.g., a central processing unit (CPU), a memory, e.g., a read-only memory (ROM) or a random access memory (RAM), and an A/D converter. The first controller 51 has a function for controlling the first charger/discharger unit 52. The first controller 51 transmits charging current information with which the value of the charging current detected by the first current detector 54 can be identified, to the electronic control device 12. The charging current information may be the value itself of the charging current detected by the first current detector 54, or may be a value obtained by correcting the value of the charging current.

The second controller 61 controls the operation of supplying power from the second power storage 32 to the load 42. The second controller 61 is an information processing apparatus including functions such as an information processing function, a calculation function, and a control function. The second controller 61 is configured mainly as a microcomputer, for example, and includes components such as a processor, e.g., a central processing unit (CPU), a memory, e.g., a read-only memory (ROM) or a random access memory (RAM), and an A/D converter. The second controller 61 has a function for controlling the second charger/discharger unit 62. The second controller 61 transmits charging current information with which the value of the charging current detected by the second current detector 64 can be identified, to the electronic control device 12. The charging current information may be the value itself of the charging current detected by the second current detector 64, or may be a value obtained by correcting the value of the charging current.

The first voltage detector 53 is implemented as a voltage detection circuit, for example. The first voltage detector 53 detects the voltage of the conductive path 56. The conductive path 56 is a conductive path electrically connected to the power path 80, and having the same potential as the power path 80. Therefore, the first voltage detector 53 can detect the voltage of the power path 80.

The second voltage detector 63 is implemented as a voltage detection circuit, for example. The second voltage detector 63 detects the voltage of the conductive path 66. The conductive path 66 is a conductive path electrically connected to the power path 80, and the same potential as the power path 80. Therefore, the second voltage detector 63 can detect the voltage of the power path 80.

The first current detector 54 is implemented as a current detection circuit, for example. The first current detector 54 detects the value of the current flowing through the conductive path 56. The first current detector 54 detects the value of the charging current supplied to the first charger/discharger unit 52. The current value detected by the first current detector 54 is a value (specifically, an analog voltage value) with which the current value of the conductive path 56 can be identified.

The second current detector 64 is implemented as a current detection circuit, for example. The second current detector 64 detects the value of the current flowing through the conductive path 66. The second current detector 64 detects the value of the charging current supplied to the second charger/discharger unit 62. The current value detected by the second current detector 64 is a value (specifically, an analog voltage value) with which the current value of the conductive path 66 can be identified.

Figure 2:
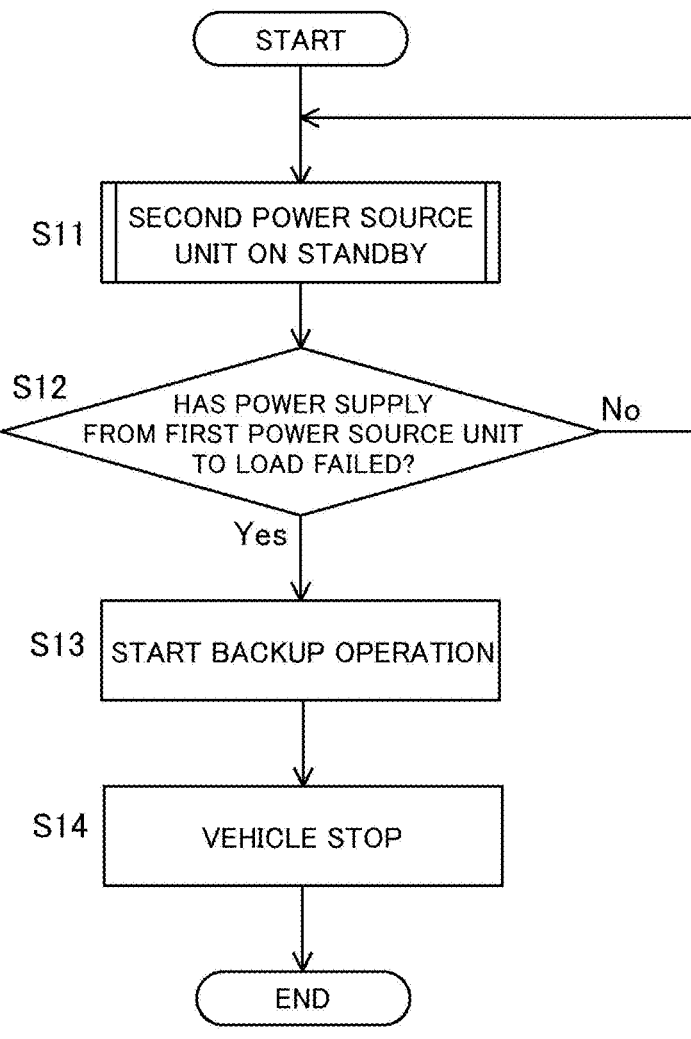
FIG. 2 is a flowchart illustrating the sequence of control performed by the on-vehicle backup control device according to the first embodiment.

The control illustrated in FIG. 2 is an example of backup control performed by the backup control device 10 (specifically, the electronic control device 12, the first controller 51, and the second controller 61). The backup control device 10 starts the backup control illustrated in FIG. 2 when a predetermined start condition is met. The condition for starting the backup control in FIG. 2 may be, for example, that the start switch of the vehicle having the on-vehicle power supply system 100 onboard is switched from the off state to the on state, or may be another condition. When the start switch of the vehicle is switched from the off state to the on state, for example, a start signal indicating that the start switch has been switched to the on state is input to the electronic control device 12. When the electronic control device 12 receives the start signal, the backup control device 10 starts the backup control illustrated in FIG. 2.

When the backup control in FIG. 2 is started, the backup control device 10 sets the second power source unit 30 (the first power storage 31 and the second power storage 32) in a standby state (step S11). The backup control device 10 performs charging so as to make the charge voltages of the first power storage 31 and the second power storage 32 equal to or higher than a target voltage which is higher than the standby voltage. The backup control device 10 maintains the charge voltages of the first power storage 31 and the second power storage 32 at the target voltage.

Figure 3:
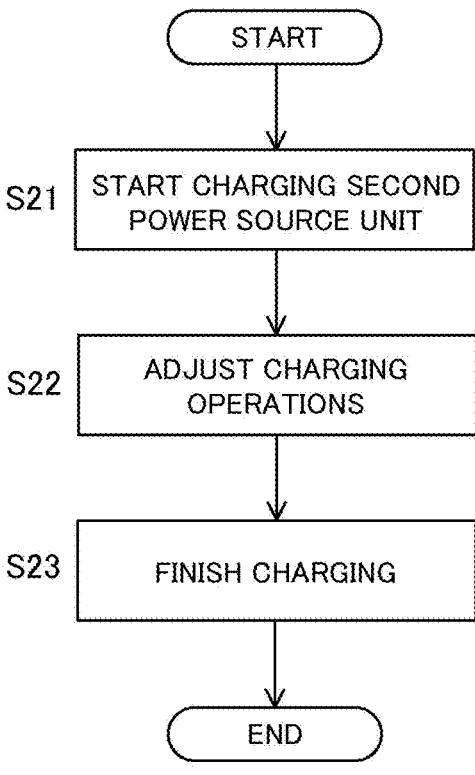
FIG. 3 is a flowchart illustrating the sequence of standby control of a second power source unit.

The control illustrated in FIG. 3 is a specific example of the processing in step S11. The backup control device 10 starts charging the second power source unit 30 (the first power storage 31 and the second power storage 32) (step S21). The adjustment unit 11 controls the first charger/discharger unit 52 and the second charger/discharger unit 62. The first charger/discharger unit 52 supplies a charging current to the first power storage 31, on the basis of the power supplied from the first power source unit 20. The second charger/discharger unit 62 supplies a charging current to the second power storage 32, on the basis of the power supplied from the first power source unit 20.

Then, the backup control device 10 adjusts the charging operations of the first charger/discharger unit 52 and the second charger/discharger unit 62 (step S22). The adjustment unit 11 adjusts the charging operations of the first charger/discharger unit 52 and the second charger/discharger unit 62 so as to keep the sum of the charging currents to the first power storage 31 and the second power storage 32 within an acceptable range. Specifically, the electronic control device 12 controls the first controller 51 and the second controller 61 so as to keep the sum of the charging currents to the first power storage 31 and the second power storage 32 within the acceptable range, on the basis of the charging current information provided from the first controller 51 and the second controller 61. The acceptable range is a preset range of current values, and one example of the acceptable range is a range higher than zero and equal to or lower than the highest current value that is acceptable in the on-vehicle power supply system 100. One example of the upper limit (acceptable threshold) of the acceptable range is a value lower than the highest current value that can flow through a fuse provided in the power path 80. The acceptable threshold is a fixed value, but may be changeable.

Suppose that the charging current information provided from the first controller 51 is a current value detected by the first current detector 54 (first current value Ia). Suppose that the charging current information provided from the second controller 61 is a current value detected by the second current detector 64 (second current value Ib). For example, the electronic control device 12 determines whether the sum of the first current value Ia and the second current value Ib is equal to or less than an acceptable threshold Imax. When the electronic control device 12 determines that Ia+Ib>Imax, the electronic control device 12 performs feedback control such that the sum of a charging current value I1, which is a charging current supplied to the first power storage 31 by the first charger/discharger unit 52, and a charging current value I2, which is a charging current supplied to the second power storage 32 by the second charger/discharger unit 62, becomes equal to or less than Imax. For example, the electronic control device 12 controls such that I1 and I2 have the same value and I1+I2≤Imax is satisfied. For example, the electronic control device 12 controls I1 to be Imax/2 and controls I2 to be Imax/2. I1 and I2 may be controlled to be current values less than Imax/2 at ratios corresponding to Ia and Ib, respectively. On the other hand, when the electronic control device 12 determines that Ia+Ib≤Imax, the electronic control device 12 continues the charging operations of the first charger/discharger unit 52 and the second charger/discharger unit 62, without making any adjustment.

The electronic control device 12 may also perform feedback control as in the following manner. For example, suppose that the electronic control device 12 is performing constant voltage charging by controlling the first charger/discharger unit 52 and the second charger/discharger unit 62, after the charging is started in step S21. In this case, it is determined whether the sum of the current value detected by the first current detector 54 (first current value Ic) and the current value detected by the second current detector 64 (second current value Id) is equal to or less than the acceptable threshold Imax. When it is determined that Ic+Id>Imax, the electronic control device 12 performs feedback control such that the sum of the charging current value I1 and the charging current value I2 becomes equal to or less than Imax. For example, the electronic control device 12 controls such that I1 and I2 have the same value and I1+I2≤Imax is satisfied. For example, the electronic control device 12 controls I1 to be Imax/2, and controls I2 to be Imax/2. I1 and I2 may be controlled to be current values less than Imax/2.

Then, when it is determined in step S23 that charging of the second power source unit 30 (the first power storage 31 and the second power storage 32) has been completed, the backup control device 10 ends the charging control in FIG. 3. The backup control device 10 determines that the charging has been completed when the output voltage of the first power storage 31 has reached the target voltage and the output voltage of the second power storage 32 has reached the target voltage.

After the end of the charging of the second power source unit 30, the backup control device 10 determines in step S12 of FIG. 2 whether the power supply from the first power source unit 20 (main power source) to the loads 41, 42 is in a failure state. The case where the power supply from the first power source unit 20 is in a failure state is, for example, a case where the voltage at the power path 80 supplying the power from the first power source unit 20 has become equal to or lower than a threshold voltage. The threshold voltage is, for example, a value significantly smaller than the output voltage applied to the power path 80 when the first power source unit 20 is in a normal condition, and is a fixed value larger than zero. However, the threshold voltage may be configured changeable. For example, the first controller 51 determines whether the voltage of the conductive path 56 is lower than the threshold (whether the voltage is at a predetermined low level) on the basis of the voltage detected by the first voltage detector 53. In an abnormal state where a ground fault, a breakage of wires or the like occurs in the power path 80 and the power supply from the first power source unit 20 to the conductive path 56 is lost, the voltage of the conductive path 56 becomes approximately 0 V. Meanwhile, the second controller 61 may determine whether the voltage of the conductive path 66 is lower than the threshold (whether the voltage is at a predetermined low level) on the basis of the voltage detected by the second voltage detector 63.

If it is determined in step S12 that the power supply from the first power source unit 20 to the loads 41, 42 is in a failure state, the backup control device 10 goes to Yes, and performs the process in step S13. On the other hand, if it is determined in step S12 that the power supply from the first power source unit 20 to the loads 41, 42 is not in a failure state, the backup control device 10 goes to No, and performs the process in step S11 again.

In step S13, the backup control device 10 starts a backup operation. The backup control device 10 causes the second power source unit 30 to supply power to the loads 41, 42. When the power based on the first power storage 31 is to be supplied to the load 41, the first controller 51 performs an operation such that a voltage based on the output voltage of the first power storage 31 (voltage at a level V1) is applied to the conductive path 57. The voltage V1 is a voltage resulting from stepping up or stepping down the output voltage from the first power storage 31 by the voltage converter circuit in the first charger/discharger unit 52. Similarly, when the power based on the second power storage 32 is to be supplied to the load 42, the second controller 61 performs an operation such that a voltage based on the output voltage of the second power storage 32 (voltage at a level V2) is applied to the conductive path 67. The voltage V2 is a voltage resulting from stepping up or stepping down the output voltage from the second power storage 32 by the voltage converter circuit in the second charger/discharger unit 62.

When it is determined in following step S14 that the vehicle having the on-vehicle power supply system 100 onboard is in a stopped state, the backup control device 10 ends the backup control in FIG. 2. Specifically, the electronic control device 12 determines whether the start switch of the vehicle having the on-vehicle power supply system 100 onboard has been switched from the on state to the off state. For example, when the start switch of the vehicle is switched from the on state to the off state, a signal indicating that the start switch has been switched to the off state is given to the electronic control device 12.

The following description relates to some examples of an advantageous effects achieved by this configuration.

In the backup control device 10 according to the first embodiment, since the adjustment unit 11 adjusts the charging operation of the first charger/discharger unit 52 and the second charger/discharger unit 62 so as to keep the sum of the charging currents to the first power storage 31 and the second power storage 32 within the acceptable range, power can be supplied from the first power source unit (main power source) 20 such that the charging currents are within the acceptable range. Therefore, by appropriately setting the acceptable range of the charging currents, it is possible to reduce the load imposed on the on-vehicle power supply system 100.

In the backup control device 10 according to the first embodiment, since the electronic control device 12 is configured to control the first controller 51 and the second controller 61, the first controller 51 and the second controller 61 can control the first charger/discharger unit 52 and the second charger/discharger unit 62, respectively, on the basis of the control of the electronic control device 12. Therefore, control in the first controller 51 and the second controller 61 can be simplified.

Second Embodiment

An on-vehicle power supply system 200 according to a second embodiment is different from that of the first embodiment in that the electronic control device 12 is not provided, and that first controller 51 and the second controller 61 can communicate with each other, but the other configurations are the same. The same components as those in the first embodiment are denoted by the same reference numerals, and detailed description thereof will be omitted.

Figure 4:
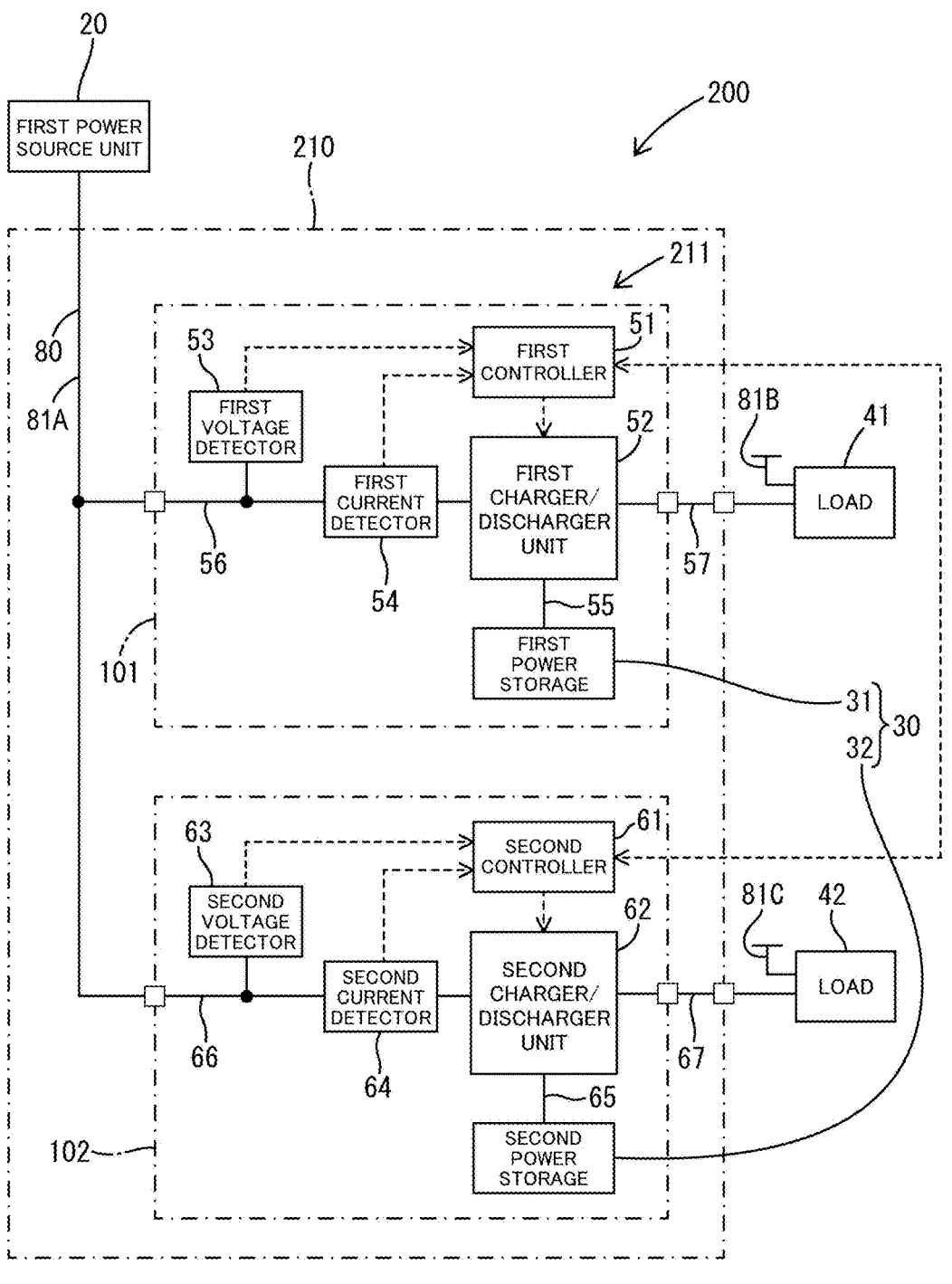
FIG. 4 is a block diagram schematically illustrating an on-vehicle power supply system including an on-vehicle backup control device according to a second embodiment.

As illustrated in FIG. 4, the on-vehicle power supply system 200 includes the first power source unit 20, the second power source unit 30, the loads 41, 42, and a backup control device 210. The backup control device 210 includes an adjustment unit 211, the first charger/discharger unit 52, the first voltage detector 53, the second charger/discharger unit 62, and the second voltage detector 63. The adjustment unit 211 includes the first controller 51, the first current detector 54, the second controller 61, and the second current detector 64.

The first controller 51 and the second controller 61 can communicate with each other. The first controller 51 can transmit the charging current information with which the value of the charging current detected by the first current detector 54 can be identified, to the second controller 61. The second controller 61 can transmit the charging current information with which the value of the charging current detected by the second current detector 64 can be identified, to the first controller 51.

The backup control device 210 according to the second embodiment performs the control illustrated in FIGS. 2 and 3, in the same manner as the backup control according to the first embodiment. The backup control performed by the backup control device 210 (specifically, the first controller 51 and the second controller 61) is different from that of the first embodiment mainly in the charging control (step S22) illustrated in FIG. 3.

In step S22, the first controller 51 and the second controller 61 adjust the charging operations of the first charger/discharger unit 52 and the second charger/discharger unit 62. The first controller 51 and the second controller 61 adjust the charging operations of the first charger/discharger unit 52 and the second charger/discharger unit 62 so as to keep the sum of the charging currents to the first power storage 31 and the second power storage 32 within the acceptable range. Specifically, the first controller 51 and the second controller 61 communicate with each other, and control the charging operations of the first charger/discharger unit 52 and the second charger/discharger unit 62 so as to keep the sum of the charging currents to the first power storage 31 and the second power storage 32 within the acceptable range, on the basis of the charging current value detected by the first current detector 54 and the charging current value detected by the second current detector 64. The acceptable range is the same as the acceptable range defined in the first embodiment.

For example, the second controller 61 controls the charging operations of the first charger/discharger unit 52 and the second charger/discharger unit 62, on the basis of the charging current information (first current value) provided from the first controller 51. The second controller 61 controls the first controller 51 by communicating therewith, and causes the first controller 51 to perform the charging operation of the first charger/discharger unit 52. The feedback control (step S22) performed by the second controller 61 is the same as the control performed by the electronic control device 12 in step S22 in the first embodiment (feedback control for making the sum of the charging current value I1 and the charging current value I2 equal to or less than Imax).

The following description relates to an example of the advantageous effects achieved by this configuration.

In the backup control device 10 according to the second embodiment, since the first controller 51 and the second controller 61 communicate with each other to control the first charger/discharger unit 52 and the second charger/discharger unit 62, it is not necessary to provide a separate control device that integrally controls the first controller 51 and the second controller 61. Therefore, the charging control can be completed within the first controller 51 and the second controller 61.

Other Embodiments

The present disclosure is not limited to the embodiments described with reference to the description and drawings above. For example, the features of the embodiments described above or below can be combined in any manner within a scope not causing inconsistency. In addition, any of the features of the embodiments described above or below can be omitted unless explicitly described as being essential. Furthermore, the embodiments described above may be modified as follows.

In the first embodiment, the on-vehicle power supply system 100 includes the two power storage units (the first power storage unit 101 and the second power storage unit 102), but may include three or more power storage units having similar configurations. In other words, the second power source unit 30 may include three or more power storages. Three or more controllers are control the corresponding charger/discharger units, and each of the charger/discharger units supplies a charging current to the corresponding power storage. The electronic control device 12 controls the controllers so as to keep a sum of charging currents to the three or more power storages within an acceptable range, on the basis of the charging current information provided from the three or more controllers. The same applies to the second embodiment, and the three or more controllers communicate with each other, and control the chargers based on the values of the charging currents detected by the corresponding detectors, so as to keep the sum of the charging currents to the corresponding power storages within the acceptable range.

In the second embodiment, the second controller 61 controls the charging operations of the first charger/discharger unit 52 and the second charger/discharger unit 62 on the basis of the charging current information (first current value) provided from the first controller 51, but it is also possible to configure the first controller 51 to control the charging operations of the first charger/discharger unit 52 and the second charger/discharger unit 62 on the basis of the charging current information (second current value) provided from the second controller 61.

In the backup control of the backup control device 10 according to the first and second embodiments, a state in which the voltage of the conductive path 56 is lower than the threshold is used as an example of the predetermined state in step S12; however, the predetermined state may be another state. For example, the predetermined state may be a state in which there is a backup operation request from the load (specifically, at least one of the first controller 51 and the second controller 61 has received a signal requesting a backup operation from the load).

In the first and second embodiments, the start switch of the vehicle has been described. The start switch may be an ignition switch. In electric vehicles or the like, the start switch may be a power switch for instructing the EV system.

In the first and second embodiments, the first power source unit 20 is a lead battery, but is not limited to a lead battery. The first power source unit 20 may be, for example, another type of battery such as a lithium-ion battery, or may be a power source such as an alternator or a converter.

In the first and second embodiments, the first power storage 31 and the second power storage 32 are electric double layer capacitors, but the power storages are not limited to the electric double layer capacitors. The first power storage 31 and the second power storage 32 may be other types of power storages such as lithium ion capacitors or lithium ion batteries.

In the first and second embodiments, the backup control device performs the backup operation when the power supply from the power source unit is lost; however, the backup control device may be configured to perform the backup operation for supplying power from the power storage in a predetermined state without complete loss of the power supply.

It should be understood that the embodiments disclosed herein are illustrative in all respects and are not restrictive. The scope of the present disclosure is not limited to the embodiments disclosed herein, and is intended to include all modifications within the scope defined by the claims or within the scope equivalent to the claims.

The invention claimed is:

1. An on-vehicle backup control device configured to be used in an on-vehicle power supply system including a first power source unit and a second power source unit that includes a plurality of power storages, and to perform a backup operation for outputting power to a load based on power from the second power source unit at least when power supply from the first power source unit to the load fails, the backup control device comprising:

a plurality of chargers each of which supplies a charging current based on power supplied from the first power source unit; and an adjustment unit that controls the plurality of chargers, wherein each of the chargers performs an operation for supplying a charging current to corresponding one of the power storages, and the adjustment unit adjusts charging operations of the plurality of chargers so as to keep a sum of the charging currents to the plurality of power storages within an acceptable range.

2. The on-vehicle backup control device according to claim 1, wherein the adjustment unit includes a plurality of controllers, a plurality of detectors, and an electronic control device, the electronic control device communicates with the plurality of controllers, each of the detectors detects a value of a charging current supplied to corresponding one of the chargers, each of the controllers controls corresponding one of the chargers, and transmits charging current information with which a value of the charging current detected by the detector can be identified, to the electronic control device, and the electronic control device controls the plurality of controllers so as to keep a sum of the charging currents to the plurality of power storages within an acceptable range, based on the charging current information provided from the plurality of controllers.

3. The on-vehicle backup control device according to claim 1, wherein the adjustment unit includes a plurality of controllers and a plurality of detectors, each of the detectors detects a value of a charging current supplied to corresponding one of the chargers, each of the controllers controls corresponding one of chargers, and the controllers communicate with each other, and control the plurality of chargers based on the values of the charging currents detected by the plurality of detectors so as to keep a sum of the charging currents to the plurality of power storages within the acceptable range.

\* \* \* \* \*